US012173609B2

(12) United States Patent
Blaszczak et al.

(10) Patent No.: US 12,173,609 B2
(45) Date of Patent: Dec. 24, 2024

(54) PRE-SWIRLER ADJUSTABILITY IN GAS TURBINE ENGINE

(71) Applicant: Siemens Energy Global GmbH & Co. KG, Munich (DE)

(72) Inventors: Grzegorz Blaszczak, Charlotte, NC (US); Anil L. Salunkhe, Charlotte, NC (US); Chad W. Heinrich, Clover, SC (US)

(73) Assignee: Siemens Energy Global GmbH & Co. KG, Munich (DE)

( * ) Notice: Subject to any disclaimer, the term of this patent is extended or adjusted under 35 U.S.C. 154(b) by 136 days.

(21) Appl. No.: 17/597,572

(22) PCT Filed: Jun. 4, 2020

(86) PCT No.: PCT/US2020/036023
§ 371 (c)(1),
(2) Date: Jan. 12, 2022

(87) PCT Pub. No.: WO2021/015861
PCT Pub. Date: Jan. 28, 2021

(65) Prior Publication Data

US 2022/0243594 A1 Aug. 4, 2022

Related U.S. Application Data

(60) Provisional application No. 62/878,436, filed on Jul. 25, 2019.

(51) Int. Cl.
*F01D 25/24* (2006.01)
*F01D 5/08* (2006.01)
*F23R 3/00* (2006.01)

(52) U.S. Cl.
CPC .............. *F01D 25/24* (2013.01); *F01D 5/082* (2013.01); *F01D 5/084* (2013.01); *F01D 5/085* (2013.01);

(Continued)

(58) Field of Classification Search
CPC ......................... F05D 2230/80; F05D 2260/14
See application file for complete search history.

(56) References Cited

U.S. PATENT DOCUMENTS 3,936,217 A 2/1976 Travaglini et al.
6,224,332 B1 * 5/2001 Leach .................... F01D 25/26 415/214.1

(Continued)

FOREIGN PATENT DOCUMENTS

CN 1971011 A 5/2007
CN 105392964 A 3/2016

(Continued)

OTHER PUBLICATIONS

PCT International Search Report and Written Opinion of International Searching Authority mailed Sep. 18, 2020 corresponding to PCT International Application No. PCT/US2020/036023 filed Jun. 4, 2020.

*Primary Examiner* — Todd E Manahan
*Assistant Examiner* — Alyson Joan Harrington

(57) ABSTRACT

A gas turbine engine having a pre-swirler adjustability is presented. The pre-swirler includes a pre-swirler insert installed in a component enclosed by a cover. The component includes an inner compressor exit diffusor enclosed by an outer casing or a shaft cover enclosed by the inner compressor exit diffusor. The pre-swirler is adjustable by replacing the pre-swirler insert. An access port including an access window is arranged on the cover. The access port gives access to the pre-swirler insert for replacement through the access window. The access window includes a manhole or combustor assembly installation hole on the outer casing, or a cutout on the inner compressor exit diffusor. The access port allows adjusting the pre-swirler by (Continued)

replacing the pre-swirler insert installed in the component without lifting the cover enclosing the component.

3 Claims, 4 Drawing Sheets

(52) U.S. Cl.
CPC .......... *F01D 5/088* (2013.01); *F05D 2230/80* (2013.01); *F05D 2240/12* (2013.01); *F05D 2240/14* (2013.01); *F05D 2260/14* (2013.01); *F23R 3/002* (2013.01)

(56) References Cited

U.S. PATENT DOCUMENTS

| | | | | |
|---|---|---|---|---|
| 6,234,746 | B1 | 5/2001 | Schroder et al. | |
| 2005/0053457 | A1* | 3/2005 | Fadok | F01D 9/041 415/1 |
| 2007/0116562 | A1 | 5/2007 | West et al. | |
| 2007/0271930 | A1* | 11/2007 | Takaoka | F01D 5/082 60/806 |
| 2008/0141677 | A1 | 6/2008 | Brillert | |
| 2011/0247347 | A1 | 10/2011 | Ebert et al. | |
| 2012/0057967 | A1* | 3/2012 | Laurello | F01D 5/081 415/178 |
| 2012/0087784 | A1 | 4/2012 | Widener | |
| 2016/0333700 | A1 | 11/2016 | Taheny et al. | |
| 2017/0037730 | A1* | 2/2017 | Tsuji | F01D 5/081 |
| 2017/0044909 | A1 | 2/2017 | Riazantsev et al. | |

FOREIGN PATENT DOCUMENTS

| | | | |
|---|---|---|---|
| CN | 106437858 | A | 2/2017 |
| CN | 106567749 | A | 4/2017 |
| EP | 1074694 | A2 | 2/2001 |
| EP | 3130753 | A1 | 2/2017 |
| JP | 2001065367 | A | 3/2001 |
| JP | 2012082822 | A | 4/2012 |
| JP | 2014066174 | A | 4/2014 |
| WO | 0188354 | A2 | 11/2001 |
| WO | 2014126994 | A1 | 8/2014 |
| WO | 2015186523 | A1 | 12/2015 |

* cited by examiner

PRE-SWIRLER ADJUSTABILITY IN GAS TURBINE ENGINE

TECHNICAL FIELD OF THE INVENTION

This invention relates generally to a gas turbine engine having pre-swirler adjustability without lifting a cover enclosing a component on which the pre-swirler is arranged and a method for adjusting a pre-swirler arranged on a component of a gas turbine engine without lifting a cover enclosing the component.

DESCRIPTION OF THE RELATED ART

An industrial gas turbine engine typically includes a compressor section, a turbine section, and a mid-frame section disposed therebetween. The compressor section includes multiple stages of compressor rotating blades and stationary vanes and an outlet guide vane assembly aft of the last stage blade and vane. The mid-frame section typically includes a compressor exit diffusor and a combustor assembly. The compressor exit diffusor diffuses the compressed air from the compressor section into a plenum through which the compressed air flows to a combustor assembly which mixes the compressed air with fuel, ignites the mixture, and transits the ignited mixture to the turbine section for mechanical power. The turbine section includes multiple stages of turbine rotating blades and stationary vanes.

Gas turbines engines are becoming larger, more efficient, and more robust. Large blades and vanes are being utilized, especially in the hot section of the engine system. In view of high pressure ratios and high engine firing temperatures implemented in modern engines, certain components, such as stationary vanes and rotating blades, require more efficient cooling to maintain an adequate component life. Cooling may be accomplished by extracting a portion of the cooler compressed air from the compressor and directing it to the turbine section, thereby bypassing combustors. However, bleeding air from the compressor may reduce gas turbine engine performance and efficiency.

Pre-swirlers are commonly used in gas turbine engines. Pre-swirlers may be installed in a circumference of a component of the gas turbine engine. Cooling air may be pre-swirled through the pre-swirlers to form a uniform cooling air flow which may reduce cooling air requirements.

SUMMARY OF THE INVENTION

Briefly described, aspects of the present invention relate to a gas turbine engine, an apparatus configured to adjust a pre-swirler arranged on a component of a gas turbine engine, and a method for adjusting a pre-swirler arranged on a component of a gas turbine engine.

According to an aspect, a gas turbine engine is presented. The gas turbine engine comprises a cover. The gas turbine engine comprises component enclosed by the cover. The gas turbine engine comprises a pre-swirler arranged on the component. The pre-swirler comprises a pre-swirler insert installed in a hole drilled through the component. The pre-swirler insert is configured to be replaceable in the drilled hole. The gas turbine engine comprises an access port including an access window arranged on the cover. The access port is configured to give access to the pre-swirler insert installed in the component for replacing the pre-swirler insert through the access window.

According to an aspect, a gas turbine engine is presented. The gas turbine engine comprises an inner compressor exit diffusor. The gas turbine engine comprises a shaft cover enclosed by the inner compressor exit diffusor. The gas turbine engine comprises a pre-swirler arranged on the shaft cover. The pre-swirler comprises a pre-swirler insert installed in a hole drilled through the shaft cover. The pre-swirler insert is configured to be replaceable in the drilled hole. The gas turbine engine comprises an access port including an access window arranged on the inner compressor exit diffusor. The access port is configured to give access to the pre-swirler insert installed in the shaft cover for replacing the pre-swirler insert through the access window.

According to an aspect, a method for a pre-swirler arranged on a component of a gas turbine engine is presented. The pre-swirler comprises a pre-swirler insert installed in the component. The pre-swirler insert is configured to be replaceable for adjustment. The method comprises arranging an access port including an access window on a cover enclosing the component to give access to the pre-swirler insert installed in the component. The method comprises replacing the pre-swirler insert through the access window.

Various aspects and embodiments of the application as described above and hereinafter may not only be used in the combinations explicitly described, but also in other combinations. Modifications will occur to the skilled person upon reading and understanding of the description.

BRIEF DESCRIPTION OF THE DRAWINGS

Exemplary embodiments of the application are explained in further detail with respect to the accompanying drawings. In the drawings.

To facilitate understanding, identical reference numerals have been used, where possible, to designate identical elements that are common to the figures.

DETAILED DESCRIPTION OF THE INVENTION

A detailed description related to aspects of the present invention is described hereafter with respect to the accompanying figures.

For illustration purpose, term “axial” or “axially” refers to a direction along a longitudinal axis of a gas turbine engine, term “radial” or “radially” refers to a direction perpendicular to the longitudinal axis of the gas turbine engine, term “downstream” or “aft” refers to a direction along a flow direction, term “upstream” or “forward” refers to a direction against the flow direction.

Figure 1:
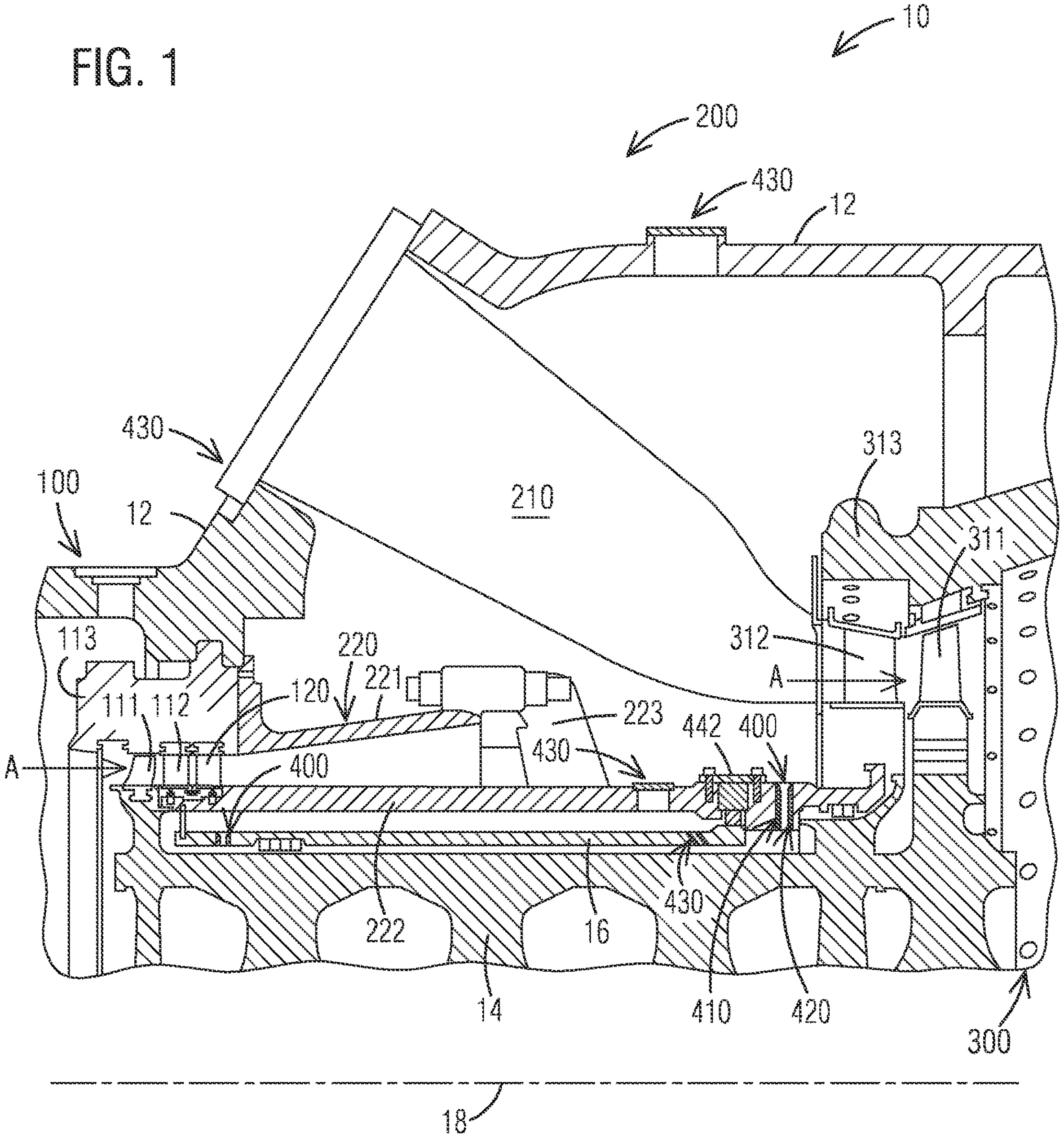
FIG. 1 is a schematic longitudinal section view of a portion of a gas turbine engine according to an embodiment of the present invention.

FIG. 1 illustrates a schematic longitudinal section view of a portion of a gas turbine engine 10 according to an embodiment of the present invention. As illustrated in FIG. 1, the gas turbine engine 10 includes a plurality of components along a longitudinal axis 18. The plurality of components may include a compressor section 100, a turbine section 300 located downstream of the compressor section 100 with respect to a flow direction A, and a mid-frame section 200 that is located there between. The gas turbine engine 10 also includes an outer casing 12 that encloses the plurality of components. A rotor 14 longitudinally connects the compressor section 100, the mid-frame section 200 and the turbine section 300 and is circumferentially enclosed thereby. The rotor 14 may be partially or fully enclosed by a shaft cover 16.

The compressor section 100 includes multiple stages of compressor rotating blades 111 and compressor stationary vanes 112. FIG. 1 only shows the last stage of compressor rotating blade 111 and compressor stationary vane 112. An outlet guide vane assembly 120 is arranged downstream of the last stage compressor vane 112. The compressor blades 111 are installed into the rotor 14. The compressor vanes 112 and the outlet guide vane assembly 120 are installed into a compressor vane carrier 113. The compressor vane carrier 113 interfaces with the outer casing 12. The turbine section 300 includes multiple stages of turbine stationary vanes 312 and turbine rotating blades 311. FIG. 1 only shows the first stage of turbine stationary vane 312 and turbine rotating blade 311. The turbine vanes 312 are installed into a turbine vane carrier 313. The turbine vane carrier 313 interfaces with the outer casing 12. The turbine blades 311 are installed into the rotor 14. The mid-frame section 200 typically includes a combustor assembly 210 and a compressor exit diffuser 220. The compressor exit diffuser 220 is located downstream of the outlet guide vane assembly 120.

The compressor exit diffusor 220 typically includes an outer compressor exit diffusor 221 and an inner compressor exit diffusor 222. The outer compressor exit diffusor 221 is connected to the inner compressor exit diffusor 222 by bolting to a strut 223. The inner compressor exit diffusor 222 may enclose the shaft cover 16. Forward side of the outer compressor exit diffusor 221 interfaces with the outer casing 12. Forward side of the inner compressor exit diffusor 222 interfaces with the last stage compressor vane 112 and the outlet guide vane assembly 120.

In operation of the gas turbine engine 10, the compressor section 100 inducts air via an inlet duct (not shown). The air is compressed in the compressor section 100 while passing through the multiple stages of compressor rotating blades 111 and compressor stationary vanes 112, as indicated by the flow direction A. The compressed air passes through the outlet guide vane assembly 120 and enters the compressor exit diffuser 220. The compressor exit diffuser 200 diffuses the compressed air to the combustor assembly 210. The compressed air is mixed with fuel in the combustor assembly 210. The mixture is ignited and burned in the combustor assembly 210 to form a combustion gas. The combustion gas enters the turbine section 300, as indicated by the flow direction A. The combustion gas is expanded in the turbine section 300 while passing through the multiple stages of turbine stationary vanes 312 and turbine rotating blades 311 to generate mechanical power which drives the rotor 14. The rotor 14 may be linked to an electric generator (not shown) to convert the mechanical power to electrical power. The expanded gas constitutes exhaust gas and exits the gas turbine engine 10.

A plurality of pre-swirlers 400 may be arranged on a component of the gas turbine engine 10. The pre-swirlers 400 may be used to accelerate cooling flow and turn the cooling flow in a direction of rotating which may reduce parasitic work required to take the air from a stationary position onboard a rotating system. The turning of the cooling air flow in the direction of rotating may reduce windage losses. The cooling flow may be turned at a rate dictated by the pressure ratio. Fine tuning of the cooling flow properties may significantly improve performance and efficiency of the gas turbine engine 10. The pre-swirler 400 includes a pre-swirler insert 420 installed in a hole 410 that is drilled through the component. The pre-swirlers 400 may be arranged at a plurality of components of the gas turbine engine 10. As illustrated in the exemplary embodiment of FIG. 1, the pre-swirlers 400 may be arranged on the inner compressor exit diffusor 222. The inner compressor exit diffusor 222 is enclosed by a cover, such as the outer casing 12. The pre-swirlers 400 may also be arranged on the shaft cover 16. The shaft cover is enclosed by a cover, such as the inner compressor exit diffusor 222.

Figure 2:
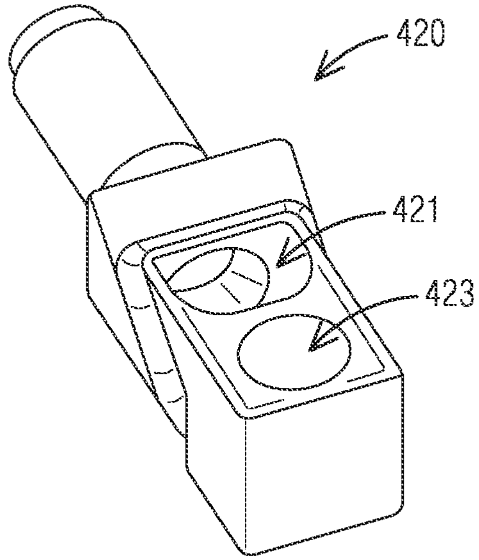
FIG. 2 is a schematic perspective view of a pre-swirler insert according to an embodiment of the present invention.
Figure 3:
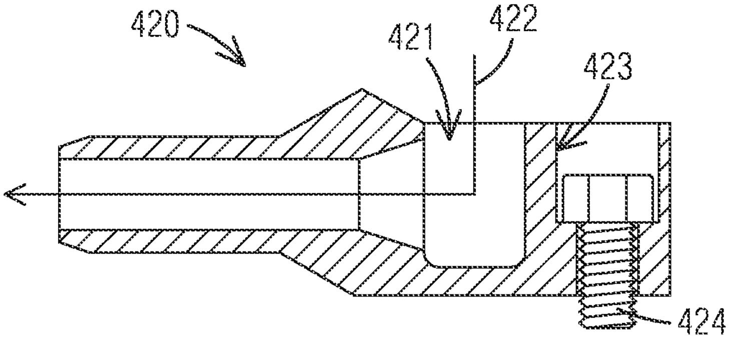
FIG. 3 is a schematic cross section view of the pre-swirler insert as shown in FIG. 2 according to an embodiment of the present invention.

FIG. 2 shows a schematic perspective view of a pre-swirler insert 420 according to an embodiment. FIG. 3 shows a schematic cross section view of the pre-swirler insert 420 in FIG. 2. As shown in FIGS. 2 and 3, the pre-swirler insert 420 includes a hollow cooling flow channel 421 for passing through cooling flow 422. The pre-swirler insert 420 includes a hole 423 for installing the pre-swirler insert 420 in the drilled hole 410 of a component, such as the inner compressor exit diffusor 222, or the shaft cover 16. The hole 423 may be a borehole (i.e., a counter-bore) for bolting the pre-swirler insert 420 into the drilled hole 410 using a bolt 424.

Figure 4:
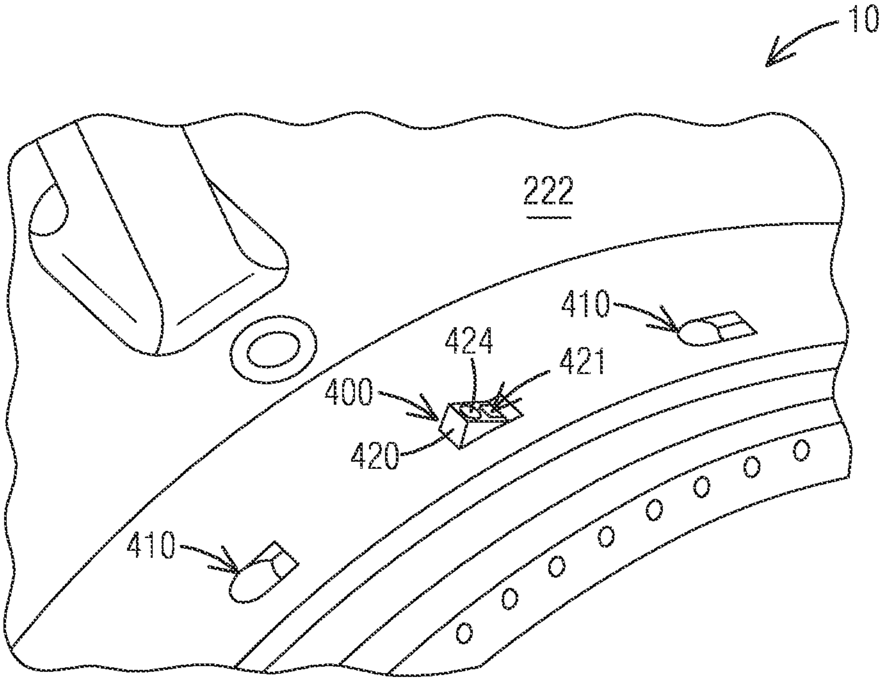
FIG. 4 is a schematic perspective view of a component of the gas turbine engine having a pre-swirler insert installed in the component according to an embodiment of the present invention.

FIG. 4 shows a schematic perspective view of an inner compressor exit diffusor 222 of the gas turbine engine 10 having a plurality of preswirlers 400. As shown in FIG. 4, the plurality of preswilers 400 are arranged on an outer circumference of the inner compressor exit diffusor 222 and spaced apart from each other. Each preswirler 400 include a preswirler insert 420 installed into a hole 410 of the inner compressor exit diffusor 222 using a bolt 424. The hole 410 is drilled into or through the inner compressor exit diffusor 222. For illustration purpose, only one preswirler insert 420 is installed in the drilled hole 410 in FIG. 4. Cooling flow 422 (see FIG. 3) enters the cooling channel 421 and is accelerated and turned in a direction as desired while passing through the cooling flow channel 421.

The cooling flow channel 421 may be designed to have a profiled shape to achieve desired design requirements of the gas turbine engine 10. For example, the cooling flow channel 421 may have a profiled shape to throttle the flow to a required flow rate, or to allow the flow to accelerate as required for high speeds, or to significantly reduce pressure drop across the drilled hole 410. Different pre-swirler inserts 420 may have different profiled shapes of cooling flow channels 421 to achieve different cooling flow properties. The different pre-swirler inserts 420 may be replaceable in the same drilled hole 410 for fine tuning cooling flow property. According to an exemplary embodiment as illustrated in FIG. 3, the cooling flow channel 421 includes a large inlet area that receives cooling flow 422 for passage through the cooling flow channel 421. The cooling flow 422 then enters a converging section having a large diameter inlet and a smaller diameter outlet. The converging section acts on the cooling air flow 422 to accelerate the cooling air flow 422 into a longer cylindrical passage that has a diameter that closely matches the diameter of the smaller diameter outlet. Of course, as noted, other shapes and arrangements of the cooling flow channel 421 are possible.

The pre-swirler inserts 420 may need to be accessible for replacement. Referring to FIG. 1, the gas turbine engine 10 includes a plurality of access ports 430 to gain access to the pre-swirler inserts 420 installed in a component of the gas turbine engine 10 for replacing the pre-swirler inserts 420 without lifting a cover enclosing the component.

Figure 5:
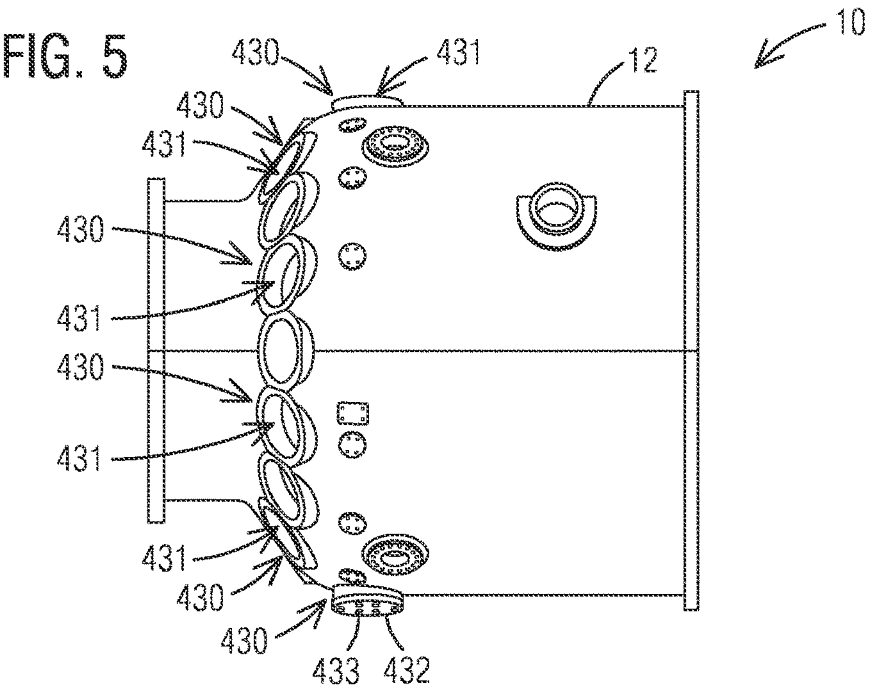
FIGS. 5 to 7 are schematic views of a cover of the gas turbine engine having an access port for replacing pre-swirler inserts installed in a component enclosed by the cover according to an embodiment of the present invention.

FIG. 5 shows a schematic view of an outer casing 12 of a gas turbine engine 10 having an access port 430 according to an embodiment. As shown in FIG. 1 and FIG. 5, the outer casing 12 includes at least one access port 430. The access port 430 includes an access window 431 for access to an interior of the gas turbine engine 10. The access window 431 may be a manhole on the outer casing 12. During maintenance of the gas turbine engine 10, a personal may access to an interior of the gas turbine engine 10 through the manhole 431 for performing maintenance work. A cover plate 432 is placed on the manhole 431 during operation of the gas turbine engine 10. The cover plate 432 may be placed on the manhole 431 using bolts 433. As shown in FIG. 5, two manholes 431 are arranged on the outer casing 12. One manhole 431 is arranged at the top half of the outer casing 12, the other manhole 431 is arranged at the bottom half of the outer casing 12. For illustration purpose, one cover plate 432 is removed from a manhole 431 in FIG. 5. The access window 431 of the access port 430 may also be a combustor assembly installation hole. The removal of an installed combustor assembly 210 allows a personal to access to an interior of the gas turbine engine 10 through the combustor assembly installation hole 431. As shown in FIG. 5, a plurality of combustor assembly installation holes 431 are arranged on circumference of the outer casing 12 for installing the plurality of combustor assemblies 210. For illustration purpose, the plurality of combustor assemblies 210 are removed from the plurality of combustor assembly installation holes 431 in FIG. 5.

Referring to FIG. 1 and FIG. 5, the access port 430 arranged on the outer casing 12 may give an access to pre-swirlers 400 arranged on a component of the gas turbine engine 10, such as the inner compressor exit diffusor 222 that is enclosed by a cover, that is the outer casing 12 as illustrated in FIG. 1 and FIG. 5, without lifting the outer casing 12. By accessing the pre-swirlers 400 through the access port 430, an existing pre-swirler insert 420 installed in the drilled hole 410 of the inner compressor exit diffusor 222 may be replaced with a different pre-swirler insert 420 having a different profile shaped cooling flow channel 421 without lifting the cover, such as the outer casing 12. The existing pre-swirler insert 420 may be unscrewed from the drilled hole 410 of the inner compressor exit diffusor 222. A different pre-swirler insert 420 having a different profile shaped cooling flow channel 421 may be screwed in the same drilled hole 410 of the inner compressor exit diffusor 222. The access window 431, such as the manhole 431, is closed by placing the cover plate 432 over the access window 431 during operation of the gas turbine engine 10. The access window 431, such as the combustor assembly installation holes 431, is closed by installing the combustor assembly 210 into the combustor assembly installation holes 431 during operation of the gas turbine engine 10.

Figure 6:
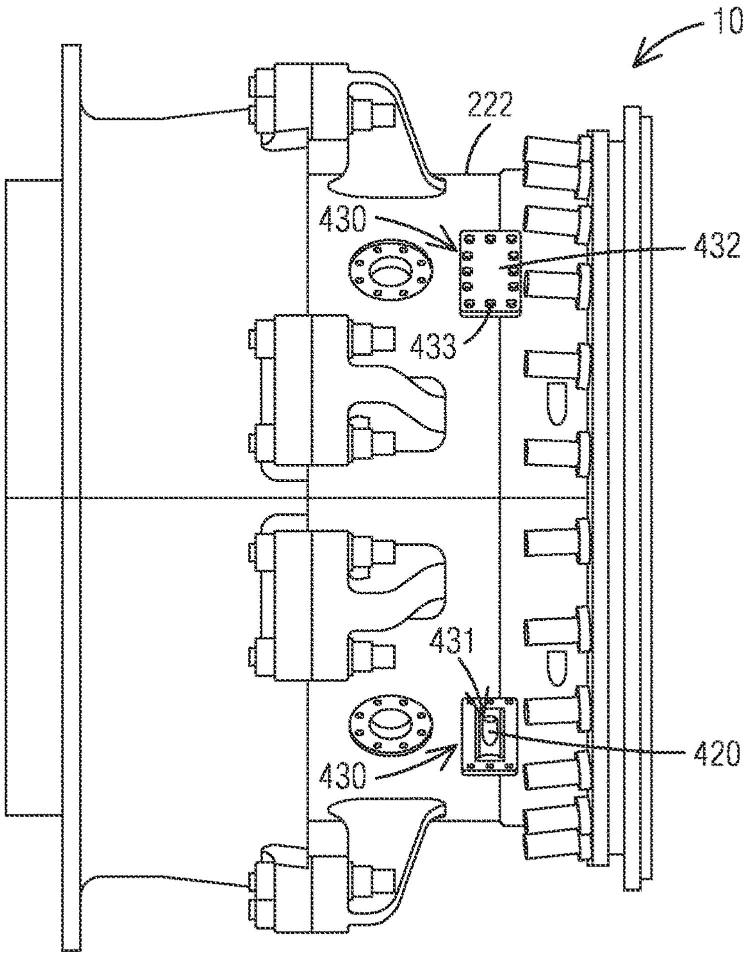

FIG. 6 shows a schematic view of an inner compressor exit diffusor 222 of a gas turbine engine 10 having an access port 430 according to an embodiment. As shown in FIG. 1 and FIG. 6, the inner compressor exit diffusor 222 includes at least one access port 430. The access port 430 include an access window 431, such as a cutout 431 cutting through the inner compressor exit diffusor 222. A cover plate 432 may be placed on the access window 431 during operation of the gas turbine engine 10, such as using bolts 433. For illustration purpose, one cover plate 432 is removed from the access window 431 in FIG. 6. The access window 431 shown in FIG. 6 has a rectangular shape. It is understood that the access window 431 may have any types of shape, such as a circular shape, an oval shape, etc. As shown in FIG. 1 and FIG. 6, the access port 430 is arranged at an aft side of the inner compressor exit diffusor 222. It is understood that the access port 430 may be arranged at any desired location of the inner compressor exit diffusor 222.

Referring to FIG. 1 and FIG. 6, the access port 430 arranged on the inner compressor exit diffusor 222 may give an access to pre-swirlers 400 arranged on a component of the gas turbine engine 10, such as the shaft cover 16 that is enclosed by a cover, that is the inner compressor exit diffusor 222 as illustrated in FIG. 1 and FIG. 6, without lifting the inner compressor exit diffusor 222. By accessing the pre-swirlers 400 through the access port 430, an existing pre-swirler insert 420 installed in the drilled hole 410 of the shaft cover 16 may be replaced with a different pre-swirler insert 420 having a different profile shaped cooling flow channel 421 without lifting the cover, such as the inner compressor exit diffusor 222. The existing pre-swirler insert 420 may be unscrewed from the drilled hole 410 of the shaft cover 16. A different pre-swirler insert 420 having a different profile shaped cooling flow channel 421 may be screwed in the same drilled hole 410 of the shaft cover 16.

A plurality of access ports 430 may be arranged on the inner compressor exit diffusor 222. Each of the plurality of access ports 430 may access at least one pre-swirler insert 420 installed in the shaft cover 16. According to an exemplary embodiment shown in FIG. 6, four access ports 430 are arranged on the inner compressor exit diffusor 220. Two access ports 430 are arranged at the top half of the inner compressor exit diffusor 222. Other two access ports 430 are arranged at the bottom half of the inner compressor exit diffusor 222. The four access ports 430 may be arranged on a circumference of the inner compressor exit diffusor 222. The four access ports 430 may be spaced apart from each other by certain circular degrees. For example, the four access ports 430 may be circumferentially spaced apart from each other by 90 degrees. One of the four access ports 430 may be arranged on the inner compressor exit diffusor 222 at 30 degrees from the horizontal direction, or at 45 degrees from the horizontal direction, or at 60 degrees from the horizontal direction. One access port 430 may be arranged at a 12 o'clock position of the inner compressor exit diffusor 222. The four access ports 430 access at least four pre-swirler inserts 420 installed in the shaft cover 16 respectively for replacing the existing pre-swirlers 420 without lifting the inner compressor exit diffusor 222. It is understood that other numbers of access ports 430 as desired may be arranged on the inner compressor exit diffusor 222, such as two access ports 430 for accessing at least two pre-swirler inserts 420, or six access ports 430 for accessing at least six pre-swirler inserts 420. The access window 431 is closed by placing the cover plate 432 over the access window 431 during operation of the gas turbine engine 10.

Figure 7:
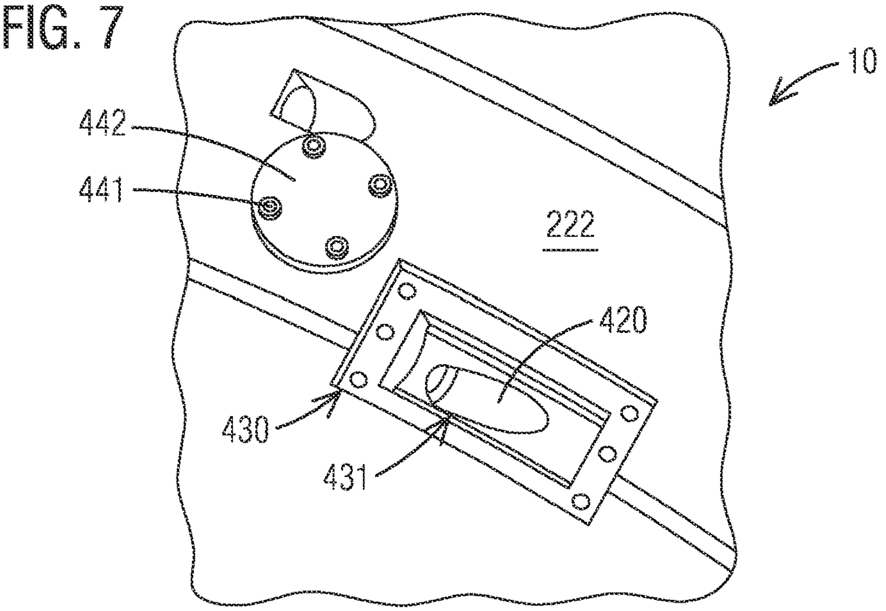

FIG. 7 shows a schematic perspective view of an inner compressor exit diffusor 222 of a gas turbine engine 10 having an access port 430 according to an embodiment. As shown in FIG. 7, the inner compressor exit diffusor 222 includes an access port 430 having an access window 431. For illustration purpose, the cover plate 432 of the access port 430 is removed from the access window 431. A pre-swirler insert 420 installed in a drilled hole 410 of the shaft cover 16 may be exposed through the access window 431 and may be replaced through the access window 431. After replacement, if another pre-swirler inset 420 installed in another drilled hole 410 of the shaft cover 16 needs to be replaced but is not exposed through the access window 431, the shaft cover 16 may need to be turned so that the another pre-swirler insert 420 may be exposed and accessible through the access window 431 for replacement. The process is described with regard to FIG. 10. The shaft cover 16 may be turned so that the pre-swirler inserts 420 installed in the shaft cover 16 that need to be replaced are exposed and accessible one by one through the access window 431 on the inner compressor exit diffusor 222. According to an embodiment, the access port 430 may be arranged at the 12 o'clock position of the inner compressor exit diffusor 222.

Figure 8:
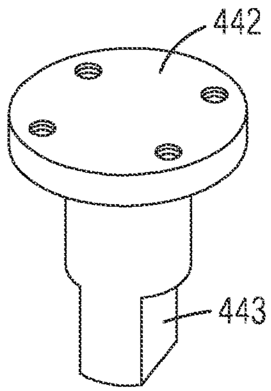
FIG. 8 is a schematic perspective view of a torque pin according to an embodiment of the present invention.

Referring to FIG. 1 and FIG. 7, the inner compressor exit diffusor 222 may include a torque pin 442 for supporting the shaft cover 16. As illustrated in the exemplary embodiment of FIG. 1, the torque pin 442 is arranged at the aft side of the inner compressor exit diffusor 222. FIG. 8 illustrates an exemplary embodiment of a torque pin 442. As shown in FIG. 8, the torque pin 442 may include a square or rectangular pin block 443 engaging the shaft cover 16. The torque pin 442 may be installed in the inner compressor exit diffusor 222 using bolts 441.

Figure 9:
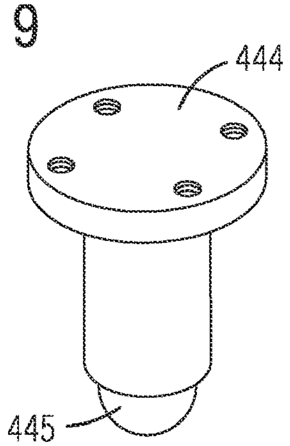
FIG. 9 is schematic perspective view of a ball pin according to an embodiment of the present invention.

Prior to turning the shaft cover 16, the torque pin 442 may be replaced with a ball pin 444. FIG. 9 illustrates an exemplary embodiment of a ball pin 444. As shown in FIG. 9, the ball pin 444 includes a ball 445. By replacing the torque pin 442 with the ball pin 444, the ball 445 of the ball pin 444 engage the shaft cover 16 so that the friction between the inner compressor exit diffusor 222 and the shaft cover 16 may be reduced during turning the shaft cover 16. The ball pin 444 may be installed in the inner compressor exit diffusor 222 using bolts 441.

Figure 10:
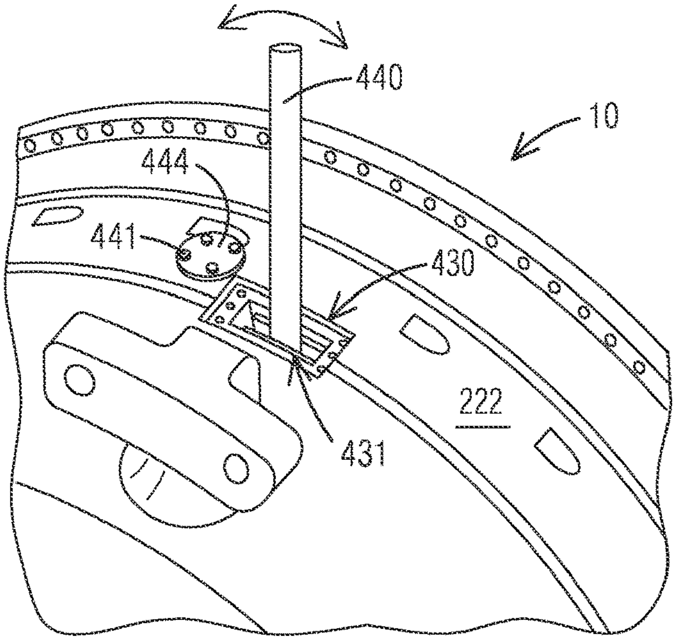
FIG. 10 is a schematic illustration for accessing pre-swirler inserts installed in a component through an access window according to an embodiment of the present invention.

FIG. 10 schematically illustrates a process for accessing pre-swirler inserts 420 installed in the shaft cover 16 through the access window 431 according to an embodiment. As shown in FIG. 10, a clocking tool 440 may be used to turn the shaft cover 16 so that a plurality of inserts 420 installed in the shaft cover 16 may be exposed through the access window 431 for replacement. The clocking tool 440 may pass through the access window 431 to engage the shaft cover 16. The clocking tool 440 may turn the shaft cover 16 in a circumferential direction, as shown by the dual arrows, so that other pre-swirler inserts 420 installed in the drilled holes 410 around the circumference of the shaft cover 16 may be exposed and accessible through the access window 431 for replacement. The pre-swirler inserts 420 installed in the shaft cover 16 are replaced without lifting the cover, that is the inner compressor exit diffusor 222. By replacing the torque pin 442 with the ball pin 444, the shaft cover 16 may be manually turned using the clocking tool 440. It is understood that the shaft cover 16 may be machine turned using the clocking tool 440. The clocking tool 440 may be an extended rod. The clocking tool 440 may be a lever arm. The clocking tool 400 may include features that wrap over the shaft cover 16 for turning the shaft cover 16. The access window 431 is closed by placing the cover plate 432 over the access window 431 during operation of the gas turbine engine 10.

According to an aspect, the proposed access port 430 may allow adjusting a pre-swirler 400 arranged in a component of a gas turbine engine 10 without lifting a cover enclosing the component. The access port 430 includes an access window 431 such as a manhole or a combustor assembly installation hole on the outer casing 12 for adjusting a pre-swirler insert 420 installed in the drilled hole 410 of the inner compressor exit diffusor 222 without lifting the outer casing 12. The access port 430 includes an access window 431 such as a cutout on the inner compressor exit diffusor 222 for adjusting a pre-swirler insert 420 installed in a drilled hole 410 of the shaft cover 16 without lifting the inner compressor exit diffusor 222.

According to an aspect, the proposed access port 430 may allow adjusting a pre-swirler 400 arranged in a component of a gas turbine engine 10 without replacing the component. The pre-swirler 400 may be adjusted by replacing an existing pre-swirler insert 420 installed in the drilled hole 410 of the component, such as the inner compressor exit diffusor 222 or the shaft cover 16, with a different pre-swirler insert 420 having a different cooling fluid channel 421 in the same drilled hole 410 of the inner compressor exit diffusor 222 or the shaft cover 16, without replacing the inner compressor exit diffusor 222 or the shaft cover 16.

According to an aspect, the proposed access port 430 may allow an adjustment of the pre-swirler 400 installed in a component of the gas turbine engine 10, such as the inner compressor exit diffusor 222 or the shaft cover 16, to be accomplished at a job site. The proposed access port 430 may thus eliminate the expense of lifting a cover enclosing the component, such as the outer casing 12 or the inner compressor exit diffusor 222. The proposed access port 430 provides significantly cost and maintenance benefits for operating a gas turbine engine 10.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

REFERENCE LIST

- 10: Gas Turbine Engine
- 12: Outer Casing
- 14: Rotor
- 16: Shaft Cover
- 18: Longitudinal Axis
- 100: Compressor Section

111: Compressor Blade
112: Compressor Vane
113: Compressor Vane Carrier
120: Outlet Guide Vane Assembly
200: Mid-Frame Section
210: Combustor Assembly
220: Compressor Exit Diffusor
221: Outer Compressor Exit Diffusor
222: Inner Compressor Exit Diffusor
223: Strut
300: Turbine Section
311: Turbine Blade
312: Turbine Vane
313: Turbine Vane Carrier
400: Pre-swirler
410: Drilled Hole
420: Pre-swirler Insert
421: Cooling Flow Channel
422: Cooling Flow
423: Hole
424: Bolt
430: Access Port
431: Access Window
432: Cover Plate
433: Bolt
440: Clocking Tool
441: Bolt
442: Torque Pin
443: Pin Block

444: Ball Pin
445: Ball

What is claimed is:

1. A method for adjusting a pre-swirler arranged on a component of a gas turbine engine, wherein the pre-swirler comprises a pre-swirler insert installed in the component, wherein the pre-swirler insert is configured to be replaceable for adjustment, the method comprising:

arranging an access port including an access window on a cover enclosing the component to give access to the pre-swirler insert installed in the component; and replacing the pre-swirler insert through the access window, wherein the cover comprises an inner compressor exit diffusor, wherein the component comprises a shaft cover, and wherein the access window is arranged by cutting a cutout on the inner compressor exit diffusor, further comprising turning the shaft cover using a clocking tool passing through the access window on the inner compressor exit diffusor for accessing a plurality of pre-swirler inserts through the access window.

2. The method as claimed in claim 1, further comprising arranging a plurality of access ports on a circumference of the inner compressor exit diffusor for accessing a plurality of pre-swirler inserts respectively.

3. The method as claimed in claim 1, further comprising replacing a torque pin installed in the inner compressor exit diffusor with a ball pin prior to turning the shaft cover.

* * * * *